Nov. 21, 1939.   H. J. MOORHOUSE   2,181,104
ADVERTISING DEVICE
Filed March 14, 1939   5 Sheets-Sheet 3
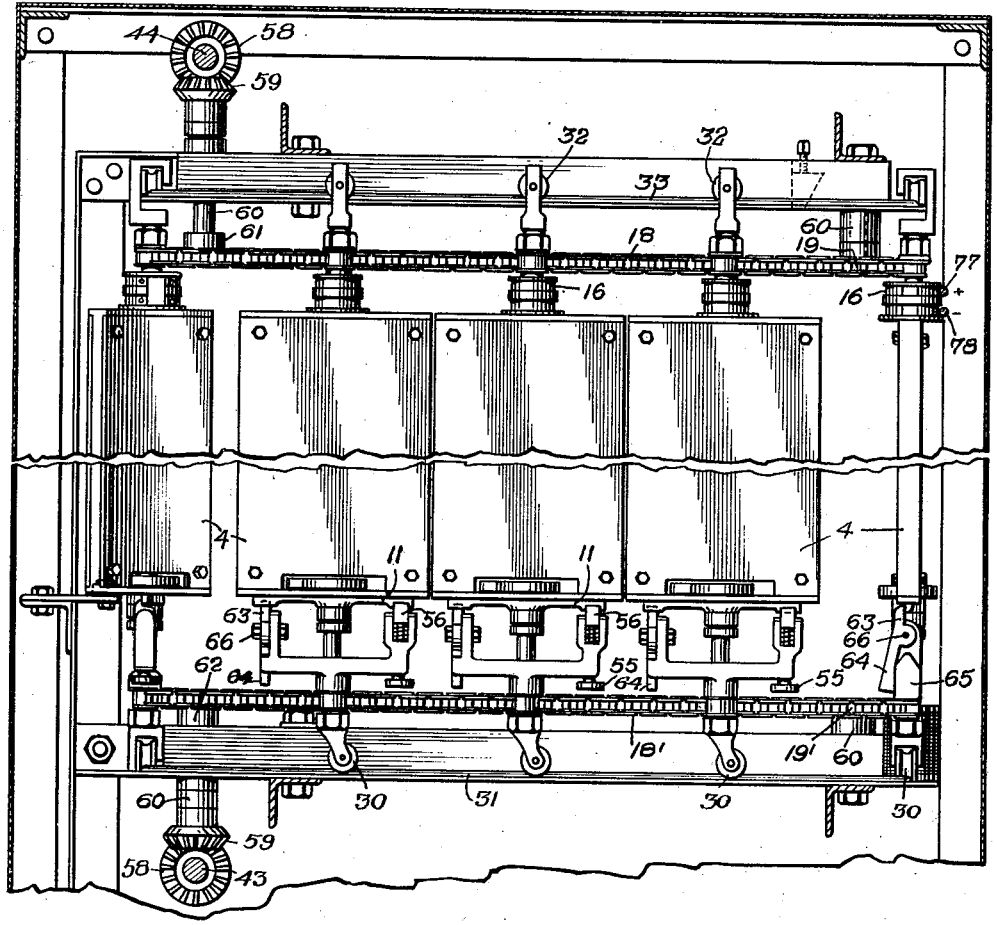
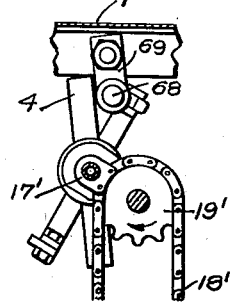
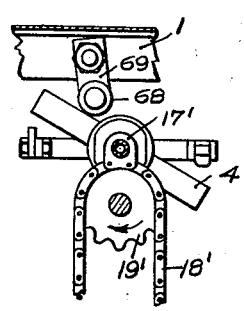
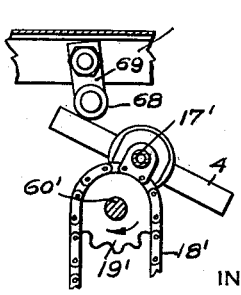
INVENTOR
H. J. Moorhouse
BY
Munn, Anderson & Liddy
ATTORNEYS

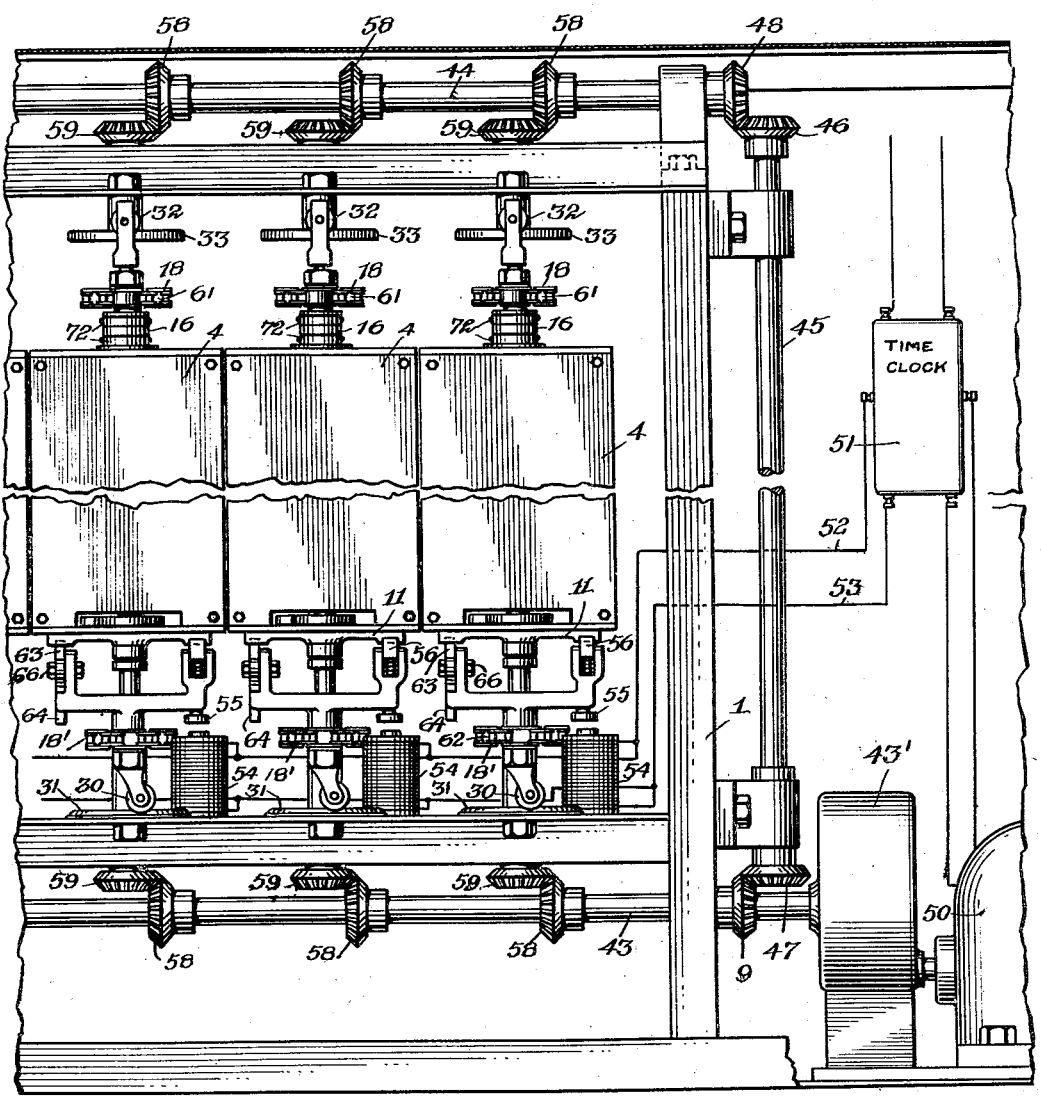

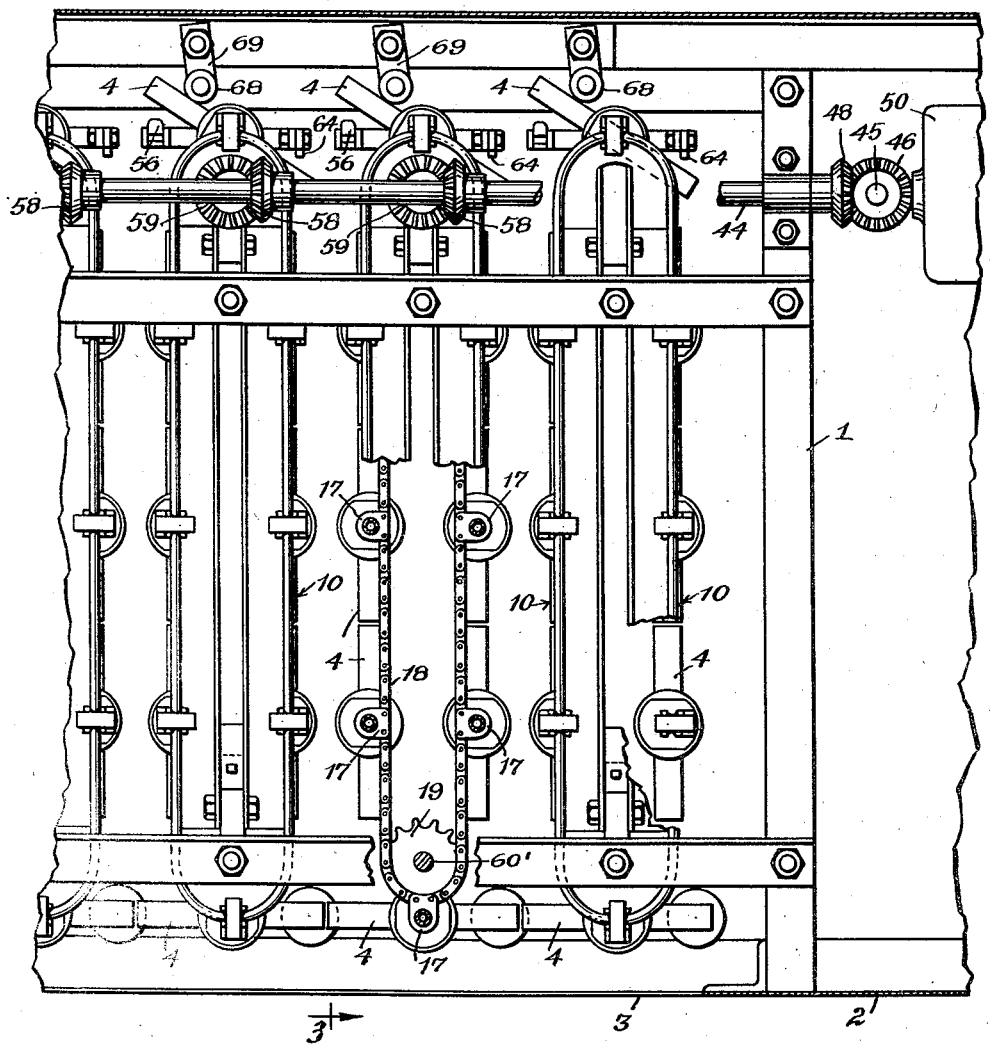

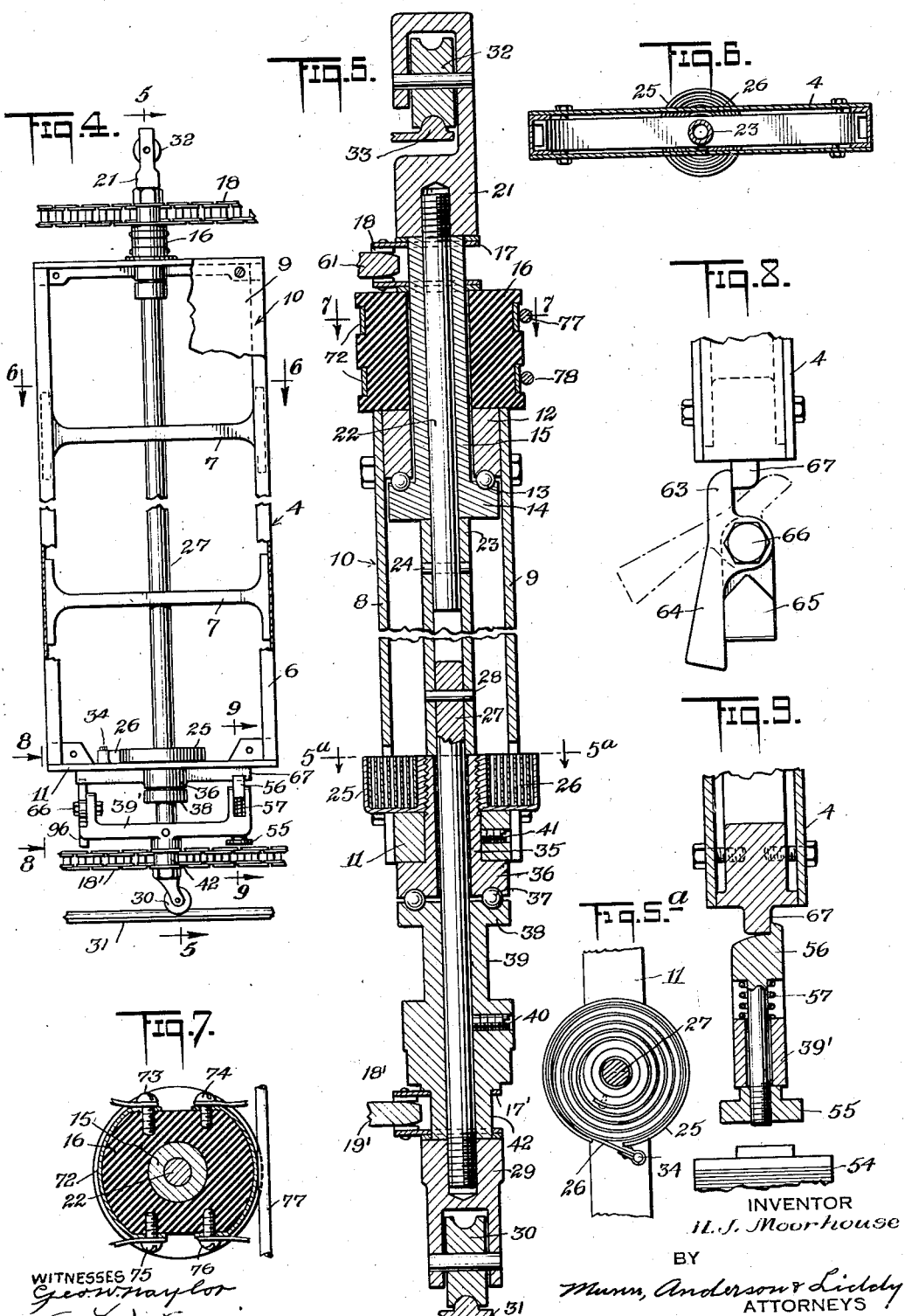

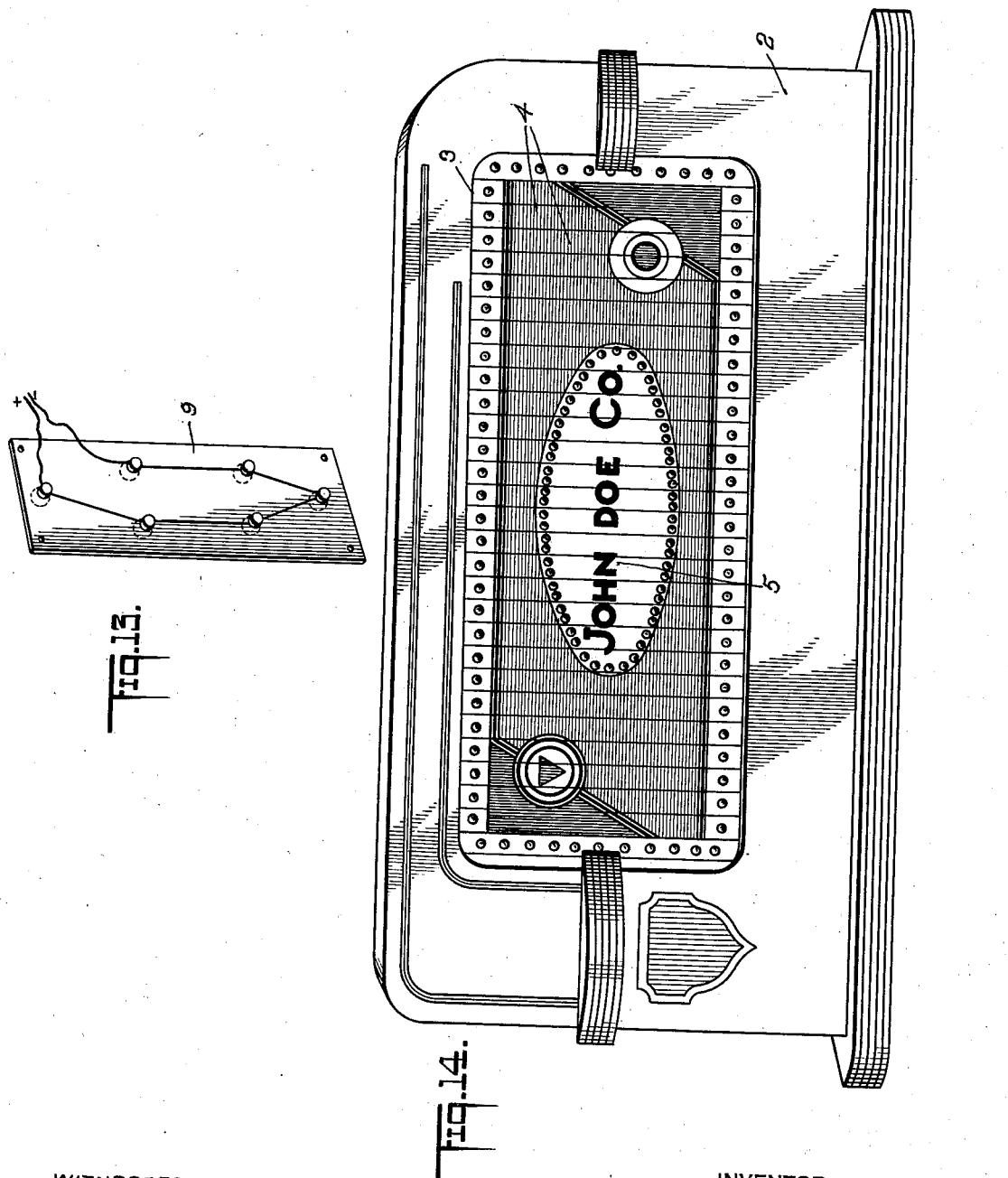

Patented Nov. 21, 1939

2,181,104

UNITED STATES PATENT OFFICE 2,181,104

ADVERTISING DEVICE

Henry James Moorhouse, South Range, Wis.

Application March 14, 1939, Serial No. 261,703

18 Claims. (Cl. 40—97)

This invention relates to advertising signs and has for an object to provide an improved construction wherein a single sign element is presented and constructed in a way that by proper manipulation it will present numerous independent signs.

Another object of the invention is to provide a sign-board which may be made small and used in a show window, or made comparatively large for outdoor use, and in each instance constructed to present sign plates or sign elements arranged so as to be aligned when moved to a certain position to present a given sign and then rearranged to present a different sign.

A further object of the invention is to provide a sign wherein groups of sign elements are arranged in parallelism and provided with mechanism for first successively exposing one side of each element and then exposing the opposite side during the operation of the sign.

An additional and more specific object of the invention is to provide a sign including a plurality of independent sign elements which are reversible so that both sides may present a given subject matter or part of a given subject matter of a larger sign.

In the accompanying drawings—

Fig. 1 is an elevation of part of a sign embodying the invention, part of the frame being broken away for better illustrating the invention;

Fig. 2 is a top plan view of the structure shown in Fig. 1, with certain portions broken away to illustrate certain moving parts;

Fig. 3 is a sectional view through Fig. 2 approximately on the line 3—3;

Fig. 4 is an enlarged detail elevation of one of the sign elements and associated parts disclosing certain features of the invention;

Fig. 5 is a sectional view through Fig. 4 approximately on the line 5—5, the same being on an enlarged scale with the central part broken away and the end portions brought together;

Fig. 5ᵃ is a transverse sectional view through Fig. 5 on the line 5ᵃ—5ᵃ;

Fig. 6 is a transverse sectional view through Fig. 4 on the line 6—6, the same being in an enlarged scale;

Fig. 7 is a fragmentary transverse sectional view through Fig. 5 on the line 7—7;

Fig. 8 is an enlarged fragmentary edge elevation of the lower part of the structure shown in Fig. 4, the view being taken from line 8—8 of Fig. 4;

Fig. 9 is a sectional view through Fig. 4 approximately on the line 9—9, the same being on an enlarged scale;

Fig. 10 is a fragmentary view partly in section showing the rear end of one group of sign elements and associated parts and illustrating how the sign member is rotated for winding a spring;

Fig. 11 is a view similar to Fig. 10 but showing the parts further advanced toward the winding of the spring;

Fig. 12 is a view similar to Fig. 11 but showing the parts still further advanced with the spring properly wound;

Fig. 13 is a detail perspective view of the rear of one of the plates shown in Figs. 4 and 5 and illustrating how electric wiring may be connected with lamps carried by the plates; and Fig. 14 is a front perspective view of a completed sign as the same will appear when in use.

Referring to the accompanying drawings by numerals, 1 indicates a framework of angle or U-shaped bars bolted or otherwise rigidly secured together, which acts to support the various parts hereinafter fully described. On top of this framework, if desired, a covering 2 forming a casing may be provided and ornamented in any desired manner, as illustrated particularly in Fig. 14. The casing 2 has a sight opening 3 through which may be seen the various sign elements 4 hereinafter fully described.

Each of the sign elements 4 may contain a single illustration or article to be advertised, or may contain parts of articles or parts of illustrations. As shown in Fig. 14, certain of the sign elements 4 are provided with ornamental members adjacent each end, while at the center of the side 3 the sign elements 4 are provided with suitable ornamentation presenting an advertisement 5. The sign elements 4 are adapted to be rotated in situ and on the opposite faces may contain the same advertisements as shown in Fig. 14 or different advertisements as may be preferred. In operation each face of the respective sign elements 4 may be exposed to view for one minute or for any other desired time according to the way the parts are set.

The various sign elements 4 are preferably constructed as shown in Figs. 4 and 5, namely, with a frame 6 having suitable braces 7 and with side plates or boards 8 and 9 bolted or otherwise rigidly secured to the frame 6. The boards 8 and 9, as shown in Fig. 13, may be supplied with electric lights or may merely be provided with advertisements painted or pasted thereon. Also, if desired, full size articles or parts of articles may be carried by each of the plates 8 and 9.

As shown in Fig. 5 each of the sign elements 4 has two plates and in use when the sign element comes to a point adjacent the sight opening 3 one face is outermost but after a short time the respective sign elements are individually quickly rotated so that the opposite face comes to view. It will of course be understood that only one plate could be used on frame 6 or in small signs the plate itself could act as the frame. As illustrated in Fig. 2, there are a number of groups 10, each group carrying a number of sign elements 4. As shown in Fig. 2, eight sign elements have been provided in each group 10, but it will be evident a greater or a less number may be provided without departing from the spirit of the invention. These groups are arranged parallel or symmetrically and extend from the front to the rear of the frame 1 and only one sign element 4 of each is exposed at a time through the sight opening 3. It will be noted that the sign elements 4 are all in alignment when either face is exposed through sight opening 3 with a small clearance therebetween. Each sign element 4 is provided with what may be termed a base bar 11 and a top bar 12. The top bar 12 is supported by a ball bearing 13 carried by a cone 14 having a stem 15 which extends upwardly to a point above the spool or drum 16 which is formed of insulating material. A special link 17 of a chain 18 is secured to the stem 15, as shown in Fig. 5, so that the respective sprocket wheels 19 and 20 may engage the chain and move the same along and with the chain the respective sign elements 4.

From Fig. 2 it will be observed that each of the special links 17 is provided with an opening through which the stem 15 projects so that the trolley member 21 may be screwed on to the rod 22 which is secured to the tubular member 23 in any suitable manner, as for instance, by a pin 24. Tube 23 extends from the cone 14 downwardly to the casing 25 of spring 26. A second bar or rod 27 is secured by pin 28 to the tubular member 23, said second bar or rod being threaded at its lower end to receive the caster 29, which caster has a grooved wheel 30 fitted on to track 31. The hanger or trolley member 21 at the top of the frame 6 is provided with a grooved wheel 32 fitting on a track 33. It will be understood that track 31 is carried by frame 1 adjacent the bottom of the device while track 33 is carried by frame 1 adjacent the top of the frame. It will be understood that a pair of tracks of this kind are provided with each group 10 so that all the sign elements 4 are supported from the top and bottom as they move from one place to another. By reason of this construction, each of the units or sign elements 4 travels into displaying position and then out of displaying position along the respective tracks.

Each of the sign elements 4, in addition to the structure above set forth, is provided with a pin 34 around which is looped one end of the spring 26, the opposite end of this spring being connected with the casing 25, which is threaded on to the tubular extension 35 of a bearing member 36. Bearing member 36 is rotatably supported by balls 37 carried by the lower bearing member 38 forming part of a sleeve 39, which sleeve is rigidly secured to the bar or rod 27 by a set screw 40. The tubular member 35 is rigidly secured to the base bar 11 by a set screw 41, but this bar and associated parts rotate around the rod 27 while the sleeve 39 moves with rod 27. A special link 17' loosely surrounds the extension 42 of sleeve 39, said link being part of a chain 18', which chain is positioned a slight distance above track 31, while chain 18 is positioned a short distance below track 33. It will therefore be understood that there are upper and lower chains and that each set of chains has special links for the respective sign elements 4. As the respective chains move the special links move the sign elements along their respective tracks 31 and 33.

When the device is in use, one sign element 4 is facing front or facing through the sight opening 3 for each group 10. At the proper time the chains begin to function as hereinafter more fully described, and will quickly move each of the sign elements 4 to a display position at the rear and, at the same time, will move a new sign element to a position facing the sight opening 3. In order that the respective upper and lower chains 18 and 18' shall function simultaneously, for each of the groups 10, there is provided a lower driving shaft 43 (Fig. 1) and an upper driving shaft 44 connected by a vertical shaft 45 meshing with gears 48 and 49. The shaft 43 is actuated by a train of gearing in housing 43', which train of gearing is in turn actuated by an electric motor 50 controlled by a time switch 51. The time switch 51 is set to provide current at spaced intervals for a short time and the movement of the motor 50 is sufficient to rotate shaft 43 and associated parts sufficiently far to cause one of the said sign elements 4 for each group 10 to move from a position in front of the sight opening 3 to a position to one side thereof and, at the same time, move a sign element 4 to a position opposite the sight opening 3. The time switch 51 at certain prescribed spaced intervals supplies current to the wires 52 and 53 for energizing the various magnets 54 for a short time so as to attract the respective armatures 55 and pull down the respective catches 56 against the action of the respective springs 57.

As indicated in Fig. 1, the respective shafts 43 and 44 are each provided with a bevel gear 58 for each group 10. The gears 58 mesh with the respective gears 59 which are rigidly secured to the respective shafts 60 and these shafts carry sprocket wheels 61 and 62, as shown in Fig. 3. For each of the respective sprocket wheels 61 and 62, there are provided idler sprocket wheels 19 and 19' in front of the machine. These idler sprocket wheels are mounted on suitable stub shafts 60'. It will be understood that the shafts 60 are in direct alignment and also the stub shafts 60' so that the respective chains 18 and 18' may move in horizontal planes to bring the respective sign elements 4 successively to the front of the machine and opposite the sight 3.

When the parts are caused to function to move to the position shown in Figs. 1 and 2, they will remain stationary for a certain length of time in this position, as, for instance, one minute. At the end of the specified time the switch 51 provides current for the respective magnets 54 temporarily and these magnets will function to quickly move the catches 56 downwardly and out of engagement with the base bar 11 of each of the sign-board members 4. As soon as this occurs, the spring 26 associated with each sign element will function to quickly rotate each sign element in situ and thereby expose the opposite face to the sight opening 3. If one face of the sign element 4 were exposed one minute usually the other face would be exposed for the same length of time and then the time switch 51 would function to energize the motor 50 to cause the various parts to be actuated for shifting a new sign element to a position opposite the sight opening 3, whereupon one face of a new sign element will be exposed, as for instance, one minute and then the respective sign elements will be quickly rotated thereby exposing the opposite face for the same length of time. After this occurs, a third sign element will be brought to the front and this action will continue as long as the device is functioning.

The construction for outdoor use may be of any size but it has been found that a sign approximately seven feet high and twenty feet long is desirable though it will be evident that larger or smaller signs may be made and that the proportion of the height to the length may be varied widely. For practical purposes the number of sign elements 4 in each group 10 is preferably sixteen and as just described both sides of each sign element will be shown, thus making a total of thirty-two exposures. Allowing one minute for each sign, it will be observed that each sign will appear thirty times in sixteen hours.

As soon as the various catches 56 have been released, the various springs 26 will quickly rotate each sign element but each member will be stopped by the extension 63 on the respective pivotally mounted stops 64, which, as shown in Fig. 8, are pivotally mounted on a suitable support 65 by a bolt or screw 66.

Each of the sign elements 4 is provided with an abutment 67 for engaging the extension 63. A little later as the sign element reaches the opposite end of the path of the actuating chains, the sign element will be rotating in a direction away from the extension 63 as shown in Fig. 4, or slightly over a half revolution, whereby the spring 26 associated with each of the sign elements 4 will be rewound. This rewinding action is disclosed more particularly in Figs. 10 to 12, inclusive. As the respective sign elements 4 reach the respective rear sprocket wheels 19 and 19', the frame 6, as shown in Fig. 4, will strike a roller 68 which is carried by a bracket 69 bolted or otherwise rigidly secured to part of the frame 1. The roller 68 is therefore fixed but will freely rotate in situ and as the frame 6 strikes this roller it will be prevented from moving bodily around the respective sprocket wheels 19 and 19'. However, the respective chains will continue to move around these sprocket wheels and will pull the tube 23 and associated parts around by reason of the special links 17 and 17'. The result is that the parts will move from the position shown in Fig. 10 to that shown in Fig. 11 where the spring is about two-thirds wound. The action continues until the parts move to the position shown in Fig. 12, whereupon the spring is completely rewound and as the chain continues to move the spring will be wound slightly more than one-half a revolution so as to allow the extension 63 of catch 64 to assume the full line position shown in Fig. 4 and also to allow the catch 56 to snap in front of the base bar 11. After this has taken place, the continued movement of the chain will move the sign element 4 off roller 68 to a position parallel to the chain, which position continues until it reaches the front of the machine. When the sign element again reaches the front of the machine it is brought around to a display position facing the sight opening 3 to be exposed to view for a desired length of time, for instance, one minute, two minutes, or longer, and then quickly rotated by the spring 26 when the member 54 is functioning. From this it will be seen that both sides of each sign element 4 are exposed to view opposite the sight opening 3 and then the sign element is moved to the rear of the device and the respective springs 26 for each of the sign elements are rewound, after which the sign elements again move to the front for another double exposure. This action continues as long as the device is in use.

Usually the sign insignia of the respective sign elements 4 will be painted or pasted thereon, though, if desired, a full size article could be placed thereon, or parts of a full size article. Also under some circumstances it may be desirable to provide illumination of the respective sign elements to illuminate the sign insignia thereon, and when this is desired the arrangement shown in Fig. 13 could be used or some other arrangement. In order to provide current to the sign elements for the arrangement shown in Fig. 13, or for some other arrangement, there is provided on each sign element a drum of insulating material 16 which is rigidly secured to the upper bar 12 in any desired manner so as to rotate with frame 6. As shown in Fig. 7, the drum 16 is provided with arc-shaped metal contact members 71 and 72 and to these members are connected suitable terminals 73, 74, 75 and 76. Current-supply wires or cables 77 and 78 are provided and supported on the frame 1 by any suitable form of insulating means. These trolley wires or cables are continuously supplied with current so that each time each drum 16 comes to the front of the machine the respective contact members 71 and 72 will be energized so that one or both faces of the sign element 4 may be illuminated. If the terminals 73 to 76 are not connected to lamps or other current-using devices no current will flow. It will therefore be seen that if desired some of the sign elements 4 could be illuminated and others left unilluminated.

While in Figs. 4 and 5 the sign elements 4 have been illustrated as having two plates, it will be evident that one plate could be used if desired though for large signs the double-plate structure is preferable.

I claim:

1. A sign comprising a frame, a plurality of groups of sign units arranged in a row, each unit including a plurality of independently rotatable sign elements, means forming part of said groups for causing said sign elements of each group to travel at right angles to said row in a given path having a front end and a rear end, means at the front end of said path for causing said sign elements to face in a given direction with all sign elements in the same plane and means functioning a predetermined time after each sign element has moved to a position at said front end for rotating each sign element a half revolution.

2. A sign including a frame, a casing enclosing said frame and provided with a sight opening, a plurality of groups of sign units arranged in said casing opposite said sight opening, each of said units including a plurality of sign elements, means forming part of said groups for causing the sign elements of the respective groups to travel toward and from said sight opening in a direction normal thereto, means adjacent said sight opening for causing each sign element as it approaches the sight opening to face said sight opening, there being one sign element in each group facing said opening so that said opening will be filled with sign elements, means associated with each sign element for rotating the same in place, and electrically actuated means for causing the first-mentioned means to function a predetermined time after the sign elements have moved to a position adjacent said sight opening, whereby both surfaces of each sign element will be exposed to view each time a sign element is brought to a position adjacent said sight opening.

3. A sign comprising a plurality of independently rotatable sign elements, means for causing said sign elements to travel in an endless path having a front end, means causing each of said sign elements to face in a given direction when reaching said front end and means functioning a predetermined time after each sign element has moved to a position at said front end for rotating each sign element a half revolution.

4. A sign including a plurality of sign elements, means for causing said sign elements to travel in an endless path having a front end, a casing including said side elements and said means, said casing having a sight opening, means causing each of said sign elements to face said sight opening on reaching one end of said travel, and means functioning a predetermined time for rotating each sign element a half revolution after the same has moved to a position adjacent said sight opening.

5. A sign including a sign element, means for rotatably mounting the sign element so that either face may be exposed, power actuated means for moving said sign element to display position with one face exposed, spring actuated means for rotating said sign element to expose the other face thereof, and a catch for releasing said spring actuated means for permitting the same to function.

6. A sign including a track having a pair of parallel straight portions and an arc-shaped portion at the end of said straight portions, a plurality of independently rotatable sign elements having traction means carried by said track, an endless chain for moving said sign element along said track, said chain having a special link for each of said sign elements, said special links being respectively rigidly connected to the respective sign elements, a pair of sprockets for causing said chain to function, said sprockets being positioned respectively adjacent the respective arc-shaped portions, means for intermittently moving said chain, said means stopping said chain each time a sign element comes to a position substantially centrally of one of said arc-shaped portions and means functioning a predetermined time after each sign element has come to a position substantially centrally of one of said arc-shaped portions for rotating each sign element a half revolution.

7. A sign including a track having a pair of parallel straight portions and an arc-shaped portion at each end of said straight portions, a casing including said track and all parts associated therewith, said casing having a sight opening adjacent one end of said track, a plurality of sign elements having traction means carried by said track, an endless chain for moving said sign elements along said track, said chain having a special link for each of said sign elements, said special links being respectively rigidly connected to the respective sign elements, a pair of sprockets for causing said chain to function, said sprockets being positioned respectively adjacent the respective arc-shaped portions, means for intermittently moving said chain, said means stopping said chain each time a sign element comes to a position adjacent said sight opening, spring means for giving each sign element an independent half revolution, and electrically actuated means for causing said spring means to function a predetermined time after the respective sign elements have reached said sight opening.

8. A sign including a supporting frame, a casing for said frame, said casing having a sight opening therein, a plurality of groups of sign units carried by said frame, said groups being arranged parallel to each other back of said sight opening with each individual group extending from near said sight opening to near the rear of said frame whereby one end of each group is positioned near said sight opening, each of said groups of sign units including a plurality of sign elements, a chain connected to all of said sign elements adjacent the top, a chain connected to all of said sign elements adjacent the bottom, a plurality of sprockets for said chains for causing the chains to function in parallel planes, and means for causing said chains to move intermittently, said means stopping the movement of the chains each time a sign element moves to a position adjacent said sight opening whereby one sign element from each group will be displayed at the same time through said sight opening.

9. A sign including a supporting frame, a casing having a sight opening, a plurality of groups of sign units carried by said frame, said groups being arranged parallel to each other and back of said sight opening, with each individual group extending from said sight opening to near the end of said frame whereby one end of each of said groups is positioned near said sight opening, each of said groups of sign units including a plurality of sign elements, a chain connecting all of said sign elements of each group adjacent the top, a second chain connecting all of said sign elements of each group adjacent the bottom, a plurality of sprocket wheels for said chains for causing the chains to function in parallel planes, means for causing said chains to move intermittently, said means stopping the movement of the chains each time a sign element moves to a position adjacent said sight opening whereby one sign element of each group will be seen at the same time through said opening, and means for rotating each sign element of each group independently, and electrically actuated means for causing the first-mentioned means to function a predetermined time after the respective sign elements reach said sight opening.

10. A sign including a sign element formed with a body, a bearing member at the top of the body for rotatably supporting the body at the top, a bearing structure for rotatably supporting the body at the bottom, a non-rotatable member adjacent the bottom of said body, a coil spring having one end connected with said non-rotatable member and the opposite end connected with said body for rotating said body, a catch engaging said body for normally preventing the functioning of said spring, means for releasing said catch, and a stop for limiting the rotation of said body by said spring.

11. A sign including a rotatably mounted sign element, a spring acting on said sign element for rotating the same in one direction, a catch engaging said sign element for normally preventing the functioning of said spring, electrically actuated means for releasing said catch so as to allow said spring to function, and an abutment adapted to swing freely in one direction positioned to swing to one side when said sign element rotates in one direction and remain stationary when said sign element rotates in the opposite direction.

12. A sign including a group of sign elements, each of said elements having a substantially flat body having front and rear surfaces, means for rotatably supporting said body, upper and lower supports for supporting all of said sign elements, endless upper and lower chains, one link of each chain being connected to said means for moving the respective sign elements in an endless path, intermittently actuated means for moving said chains simultaneously, said last-mentioned means stopping said chains each time a sign element member reaches a predetermined position, a coil spring connected to the first-mentioned means and to said body for rotating said body, a catch for normally holding said spring against functioning, electrically actuated means for releasing the catch of said sign elements at a predetermined time after reaching said predetermined position, and a stop for limiting the rotary movement of said sign elements to a one-half revolution so that both sides of the bodies of said sign elements will be exposed to view a predetermined time at said predetermined position.

13. A sign including a casing having a sight opening, a plurality of groups of sign elements arranged in said casing, means for moving said group of sign elements in an endless path with one portion of the path adjacent said sight opening, said means moving the sign elements intermittently with a pause in the movement each time a sign element comes adjacent said sight opening, means for causing each sign element as it approaches said sight opening to turn parallel to the sight opening so that there will be a row of sign elements filling said sight opening, spring actuated means for each sign element for rotating the sign element in place so that when the sign elements move to the sight opening one face of each sign element will be exposed and when said spring actuated means functions the opposite face will be exposed, and electrically actuated means for causing said spring actuated means to function a predetermined time after the sign elements have reached said sight opening.

14. A sign including a casing having a sight opening, a plurality of groups of sign elements, each of said sign elements being independently rotatable, means for moving successively the sign elements of each group to said sight opening, said means functioning so that all groups will operate at the same speed and one sign element of each group will be exposed through said sight opening at the same time and means functioning a predetermined time after each sign element has moved to a position adjacent said sight opening for rotating each sign element a half revolution.

15. A sign including a casing having a sight opening, a plurality of independently rotatable sign elements of substantially the same height as said sight opening but of much less width, means for intermittently moving and aligning groups of said sign elements in said sight opening, the number of sign elements in each of said groups being sufficient to fill said sight opening and means functioning a predetermined time after each sign element has moved to a position adjacent said sight opening for rotating each sign element a half revolution.

16. A sign including a sign element, means for mounting the sign element so that either face may be exposed, power actuated means for moving said sign element along a given path to display position with one face exposed, means for rotating said sign element to expose the other face thereof, a spring for rotating said last-mentioned means, means for automatically bringing under tension said spring as the sign element moves along said path, and a catch for releasing the means for rotating said sign element for permitting said spring to function.

17. A sign including a track having a pair of parallel straight portions and an arc-shaped portion at each end of said straight portions, a casing including said track and all parts associated therewith, said casing having a sight opening adjacent one end of said track, a plurality of sign elements having traction means carried by said track, an endless chain for moving said sign elements along said track, said chain having a special link for each of said sign elements, said special links being respectively rigidly connected to the respective sign elements, a pair of sprockets for causing said chain to function, said sprockets being positioned respectively adjacent the respective arc-shaped portions, means for intermittently moving said chain, said means stopping said chain each time a sign element comes to a position adjacent said sight opening, spring means for giving each sign element an independent half revolution, electrically actuated means for causing said spring means to function a predetermined time after the respective sign elements have reached said sight opening, and means for automatically winding the spring of said spring means before the sign element reaches said sight opening.

18. A sign including a sign element formed with a body, a bearing member at the top of the body for rotatably supporting the body at the top, a bearing structure for rotatably supporting the body at the bottom, a non-rotatable member adjacent the bottom of said body, a coil spring having one end connected with said non-rotatable member and the opposite end connected with said body for rotating said body, a catch engaging said body for normally preventing the functioning of said spring, means for releasing said catch, means for automatically winding said spring after each release of said catch, and a stop for limiting the rotation of said body by said spring.

HENRY JAMES MOORHOUSE.